(12) United States Patent
Xin et al.

(10) Patent No.: US 11,546,644 B2
(45) Date of Patent: Jan. 3, 2023

(54) BANDWIDTH CONTROL METHOD AND APPARATUS, AND DEVICE

(71) Applicant: Huawei Technologies Co., Ltd., Shenzhen (CN)

(72) Inventors: Xianyin Xin, Shenzhen (CN); Bo Zhao, Hangzhou (CN); Guilin Sun, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 587 days.

(21) Appl. No.: 16/586,037

(22) Filed: Sep. 27, 2019

(65) Prior Publication Data
US 2020/0029110 A1    Jan. 23, 2020

Related U.S. Application Data

(63) Continuation of application No. PCT/CN2018/074260, filed on Jan. 26, 2018.

(30) Foreign Application Priority Data

Mar. 29, 2017    (CN) .......................... 201710198002.X

(51) Int. Cl.
*H04N 21/24* (2011.01)
*H04L 12/40* (2006.01)
(Continued)

(52) U.S. Cl.
CPC ... *H04N 21/2402* (2013.01); *H04L 12/40065* (2013.01); *H04L 12/5602* (2013.01);
(Continued)

(58) Field of Classification Search
CPC ............ H04N 21/2402; H04N 21/2385; H04L 12/40065; H04L 12/5602; H04L 47/70;
(Continued)

(56) References Cited

U.S. PATENT DOCUMENTS

| | | | |
|---|---|---|---|
| 2004/0228291 A1* | 11/2004 | Huslak | H04N 7/152 370/352 |
| 2007/0064604 A1 | 3/2007 | Chen et al. | |
| 2013/0265385 A1* | 10/2013 | Wang | H04L 65/1006 348/14.09 |

FOREIGN PATENT DOCUMENTS

| | | |
|---|---|---|
| CN | 102571526 A | 7/2012 |
| CN | 103049219 A | 4/2013 |

(Continued)

OTHER PUBLICATIONS

Machine Translation and Abstract of Chinese Publication No. CN102693160, dated May 18, 2016, 8 pages.
(Continued)

*Primary Examiner* — Patrice L Winder
*Assistant Examiner* — Angela M Widhalm De Rodriguez
(74) *Attorney, Agent, or Firm* — Conley Rose, P.C.

(57) ABSTRACT

A bandwidth control method, apparatus, and a device, in the field of computer technologies includes determining an upper bandwidth limit of the device when providing a service for registered clients, resetting an upper bandwidth limit of each client based on a working status of each client and the upper bandwidth limit of the device, and reallocating a bandwidth to each client based on the upper bandwidth limit of each client.

17 Claims, 3 Drawing Sheets

(51) Int. Cl.
*H04L 12/54* (2022.01)
*H04M 3/14* (2006.01)
*H04N 21/2385* (2011.01)
*H04L 47/70* (2022.01)
*H04L 47/78* (2022.01)
*H04L 67/1012* (2022.01)
*H04L 67/1029* (2022.01)
*H04L 12/70* (2013.01)

(52) U.S. Cl.
CPC .............. *H04L 47/70* (2013.01); *H04L 47/78* (2013.01); *H04L 67/1012* (2013.01); *H04L 67/1029* (2013.01); *H04M 3/14* (2013.01); *H04N 21/2385* (2013.01); *H04L 2012/5632* (2013.01)

(58) Field of Classification Search
CPC . H04L 47/78; H04L 67/1012; H04L 67/1029; H04L 2012/5632; H04M 3/14
See application file for complete search history.

(56) References Cited

FOREIGN PATENT DOCUMENTS

| CN | 103503371 A | 1/2014 |
|---|---|---|
| CN | 105242955 A | 1/2016 |
| CN | 102693160 B | 5/2016 |
| CN | 103503371 B | 2/2017 |
| CN | 106453143 A | 2/2017 |

OTHER PUBLICATIONS

Machine Translation and Abstract of Chinese Publication No. CN103049219, dated Apr. 17, 2013, 14 pages.
Machine Translation and Abstract of Chinese Publication No. CN103503371, dated Feb. 22, 2017, 18 pages.
Machine Translation and Abstract of Chinese Publication No. CN105242955, dated Jan. 13, 2016, 24 pages.
Machine Translation and Abstract of Chinese Publication No. CN106453143, dated Feb. 22, 2017, 41 pages.
Heinanen, J., et al. "A Single Rate Three Color Marker," RFC 2697, Sep. 1999, 6 pages.
Heinanen, J., et al. "A Two Rate Three Color Marker," RFC 2698, Sep. 1999, 5 pages.
Foreign Communication From A Counterpart Application, Chinese Application No. 201710198002.X, Chinese Office Action dated Nov. 26, 2019, 8 pages.
Foreign Communication From A Counterpart Application, PCT Application No. PCT/CN2018/074260, English Translation of International Search Report dated Mar. 7, 2018, 2 pages.
Foreign Communication From A Counterpart Application, PCT Application No. PCT/CN2018/074260, English Translation of Written Opinion dated Mar. 7, 2018, 4 pages.

* cited by examiner

BANDWIDTH CONTROL METHOD AND APPARATUS, AND DEVICE

CROSS-REFERENCE TO RELATED APPLICATION

This application is a continuation application of International Patent Application No. PCT/CN2018/074260 filed on Jan. 26, 2018, which claims priority to Chinese Patent Application No. 201710198002.X filed on Mar. 29, 2017. The disclosures of the aforementioned applications are hereby incorporated by reference in their entireties.

TECHNICAL FIELD

This application relates to the field of computer technologies, and in particular, to a bandwidth control method and apparatus, and a device.

BACKGROUND

With continuous development of computer technologies and network technologies, data cloud storage has become a development trend in a current data processing field. A user may first store some data to a network, and then obtain the stored data from the network when needed.

A network device in a data cloud storage system may provide diversified data services for a user, such as data import, data query, and data downloading. After receiving a data service request that is sent by a user using a client, the network device may set a particular upper bandwidth limit for the client, and allocate a bandwidth to the client based on the upper bandwidth limit such that the client exchanges data with the device based on the allocated bandwidth.

During a process of implementing this application, the inventor finds the following problem.

The network device averagely allocates a total bandwidth to each client. An upper bandwidth limit of each client is usually unchanged. For example, when a required bandwidth of a client is greater than an upper bandwidth limit of the client, even if there are still a large quantity of unallocated bandwidths in the network device, the client cannot use these bandwidths. In this case, bandwidth allocation flexibility is relatively poor.

SUMMARY

To resolve the foregoing problem of low bandwidth utilization of a network device resulting from relatively poor bandwidth allocation flexibility, embodiments of the present disclosure provide a bandwidth control method and apparatus, and a device. The technical solutions are as follows.

According to a first aspect, a bandwidth control method is provided, where the method is applied to a network device, the network device is configured to provide a service for a plurality of clients, the clients have registered with the network device, and the method includes the following.

When providing the service for the registered clients, the network device may determine an upper bandwidth limit of the network device, reset an upper bandwidth limit of each client based on a working status of each client and the upper bandwidth limit of the network device, and allocate a bandwidth of the network device to each client based on the upper bandwidth limit of each client. The working status of the client includes an offline state, an on-hook state, and a transmission state. The offline state is a state in which a client has not established a connection to the network device, the on-hook state is a state in which a client has established a connection to the network device and a bandwidth is less than a preset threshold, and the transmission state is a state in which a client has established a connection to the network device and a bandwidth is greater than the preset threshold.

In the solution shown in an embodiment of the present disclosure, the network device may dynamically adjust the upper bandwidth limit of each client based on the working status of the client in order to set a relatively low upper bandwidth limit for a client that needs a relatively low bandwidth and set a relatively high upper bandwidth limit for a client that needs a relatively high bandwidth, and reallocate a bandwidth to the client based on an adjusted upper bandwidth limit. This improves bandwidth allocation flexibility.

In a possible implementation, the network device may obtain a bandwidth of each of the plurality of clients, determine a level-2 bandwidth allocation value of each client based on the upper bandwidth limit of the network device, the working status of each client, and the bandwidth of each client, where the level-2 bandwidth allocation value is a bandwidth value that is allocated to the client when bandwidth utilization of the network device is the highest, and set the upper bandwidth limit of each client based on the level-2 bandwidth allocation value of each client.

In the solution shown in this embodiment of this application, the network device may determine the level-2 bandwidth allocation value of each client based on the working status of each client and the bandwidth of each client, and reset the upper bandwidth limit of each client based on the level-2 bandwidth allocation value. This can ensure highest bandwidth utilization of the network device.

In a possible implementation, the network device may first determine, based on the upper bandwidth limit of the network device and the working status of each client, a shared bandwidth threshold used to determine whether to adjust the upper bandwidth limit, for each first-type client whose bandwidth is less than the shared bandwidth threshold, determine a bandwidth of the client as a level-2 bandwidth allocation value of the client, and for each second-type client whose bandwidth is greater than or equal to the shared bandwidth threshold, determine a quotient obtained by dividing a remaining unallocated bandwidth value by a quantity of second-type clients as a level-2 bandwidth allocation value of the client, where the remaining unallocated bandwidth value is a difference between the upper bandwidth limit of the network device and a total bandwidth of all first-type clients.

In the solution shown in this embodiment of this application, the network device may determine the shared bandwidth threshold based on the working status of each client and the upper bandwidth limit of the network device, and when the bandwidth is less than the shared bandwidth threshold, the bandwidth allocated to the client is greater than a required bandwidth, and therefore the surplus bandwidth may be shared to the client whose bandwidth is greater than the shared bandwidth threshold. In this way, bandwidth utilization of the network device can be improved.

In a possible implementation, the network device may determine an entirely fair bandwidth allocation value of each client, where the entirely fair bandwidth allocation value is a bandwidth value that is allocated to each client when the upper bandwidth limit of the network device is averagely allocated to all the clients, and determine a level-1 bandwidth allocation value of each client based on the upper bandwidth limit of the network device and the working status of each client, where the level-1 bandwidth allocation value is a bandwidth value that is allocated to each client when the upper bandwidth limit of the network device is averagely allocated to all clients that are in an on-hook state and in a transmission state. In this way, the network device can reset the upper bandwidth limit of each client to a largest value among the entirely fair bandwidth allocation value, the level-1 bandwidth allocation value, and the level-2 bandwidth allocation value that are of each client.

In a possible implementation, the network device may determine the upper bandwidth limit of the network device based on a magnetic disk load status of the network device and a throughput rate of the network device.

In a possible implementation, the network device may obtain a preset client weight used to indicate a bandwidth allocation proportion of each client, determine, based on the working status of each client and the preset client weight of each client, a bandwidth allocation share corresponding to each client, and reset the upper bandwidth limit of each client based on the upper bandwidth limit of the network device and the bandwidth allocation share corresponding to each client.

In the solution shown in this embodiment of this application, when setting the upper bandwidth limit for the client, the network device may preset the client weight to allocate a high bandwidth for a relatively important client. In this way, bandwidth allocation flexibility can be improved.

In a possible implementation, the network device may obtain a preset value range of the upper bandwidth limit of each client, and reset the upper bandwidth limit of each client within the preset value range of the upper bandwidth limit of each client based on the upper bandwidth limit of the network device and the working status of each client.

In the solution shown in this embodiment of this application, the network device may set the upper bandwidth limit for the client based on the preset value range of the upper bandwidth limit of each client. In this way, different value ranges can be set for upper bandwidth limits of different clients, for example, a range including higher values is set for an important client and a range including lower values is set for an unimportant client such that sufficient bandwidths are reserved for some important clients, and some unimportant clients can be prevented from occupying excessive high bandwidths.

In a possible implementation, for a client in a transmission state, the network device may obtain service types of a plurality of services that are being transmitted by the client, determine, based on a prestored correspondence between a service type and a service weight, a service weight corresponding to a service type of each service of the client, where the service weight herein is a value used to indicate importance of each service type, and reset an upper bandwidth limit of each service of the client based on an upper bandwidth limit of the client and the service weight corresponding to the service type of each service of the client.

In the solution shown in this embodiment of this application, the network device may set, based on the service type of the service, the upper bandwidth limit for each of the plurality of services that are being transmitted by the client. In this way, sufficient bandwidths can be reserved for some important services, and some unimportant services can be prevented from occupying excessive high bandwidths.

In a possible implementation, the network device may preset a condition for triggering resetting of the upper bandwidth limit of each client. For example, the network device may periodically perform the foregoing processing, and therefore can redetermine the upper bandwidth limit of the network device at a preset time interval, alternatively, the network device may detect the bandwidth of the client in real time, and redetermine the upper bandwidth limit of the network device when the bandwidth of the client changes, where the network device may set a bandwidth change amplitude of the client herein, and redetermine the upper bandwidth limit of the network device when a bandwidth change amplitude of a client exceeds a preset value. Then, the network device may reset the upper bandwidth limit of each client based on the redetermined upper bandwidth limit of the network device.

In the solution shown in this embodiment of this application, the network device may periodically reset the upper bandwidth limit for each client, or reset the upper bandwidth limit of each client when the bandwidth of the client changes. This can ensure that bandwidths are controlled flexibly in a timely manner.

According to a second aspect, a network device is provided, where the network device includes a transceiver, a processor, and a memory, and the processor executes an instruction to implement the bandwidth control method according to the first aspect.

According to a third aspect, a bandwidth control apparatus is provided, where the apparatus includes at least one module, and the at least one module is configured to implement the bandwidth control method according to the first aspect.

According to a fourth aspect, a computer program product including an instruction is provided, where when the computer program product runs on a network device, the network device performs the bandwidth control method according to the first aspect.

Technical effects of the second aspect, the third aspect, and the fourth aspect in the embodiments of the present disclosure are similar to the technical effects obtained through technical means corresponding to the first aspect. Details are not described herein again.

Beneficiary effects brought by the technical solutions provided in the embodiments of the present disclosure are as follows.

In the embodiments of the present disclosure, when providing the service for the registered clients, the network device may determine the upper bandwidth limit of the network device, reset the upper bandwidth limit of each client based on the working status of each client and the upper bandwidth limit of the network device, and reallocate the bandwidth to each client based on the upper bandwidth limit of each client. In this way, if the working status of the client changes, the network device can correspondingly adjust the upper bandwidth limit of each client in a relatively timely manner, and reallocate the bandwidth to each client based on the upper bandwidth limit of each client. Therefore, bandwidth allocation flexibility can be improved.

DESCRIPTION OF EMBODIMENTS

To make the objectives, technical solutions, and advantages of this application clearer, the following further describes the implementations of the present disclosure in detail with reference to the accompanying drawings.

Terms such as "component", "module", and "system" used in this application are used to indicate computer-related entities. The computer-related entities may be hardware, firmware, combinations of hardware and software, software, or software in running. For example, a component may be but is not limited to, a process that runs on a processor, a processor, an object, an executable file, a thread of execution, a program, and/or a computer. In an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate using a local and/or remote process and according to, for example, a signal having one or more data packets (for example, data from one component, where the component interacts with another component in a local system or a distributed system, and/or interacts with other systems via a network such as the Internet using a signal).

Figure 1:
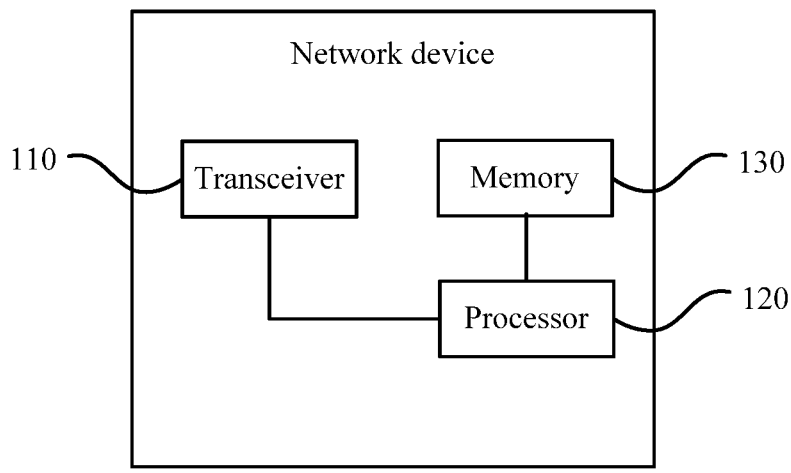
FIG. 1 is a schematic structural diagram of a network device according to an embodiment of this application.

The embodiments of the present disclosure provide a bandwidth control method, where the method is performed by a network device. The network device may be configured to provide a service for a plurality of clients, and the clients have registered with the network device. The client and a magnetic disk of the network device perform data read/write interaction. The network device may perform adjustment control on an upper bandwidth limit of each client when providing a data service for the client. The network device may be a server providing a data read/write service or may be a central management device, of a network device group, providing a data read/write service. The network device group has a unified data read/write interface, and the client may exchange data with the network device using the unified data read/write interface. The network device may include a transceiver 110, a processor 120, and a memory 130. Both the transceiver 110 and the memory 130 may be connected to the processor 120. As shown in FIG. 1, a connection manner in the figure is merely an example, the network device may alternatively be a device in an architecture similar to a general-purpose computer architecture, and the processor 120, the memory 130, and the transceiver 110 are connected using a bus. This is not limited in the embodiments of the present disclosure. The transceiver 110 may be configured to receive or send a message or data, and the transceiver 110 may include but is not limited to at least one amplifier, a tuner, one or more oscillators, a coupler, a low noise amplifier (LNA), and a duplexer. The memory 130 may be configured to store data that is generated locally or sent by the client during bandwidth control. The processor 120 may be a control center of the network device, and connects various parts of the entire network device using various interfaces and lines, for example, the transceiver 110 and the memory 130. Optionally, the processor 120 may include one or more processing units. Optionally, an application processor and a modem processor may be integrated in the processor 120. The application processor mainly processes an operating system, and the modem processor mainly processes wireless communication. The processor 120 may alternatively be a digital signal processor, an application-specific integrated circuit (ASIC), a field-programmable gate array (FPGA) or another programmable logic device, or the like. The processor 120 may be a general-purpose processor, including a central processing unit (CPU), a network processor (NP), and the like, or may be a digital signal processor (DSP), an ASIC, an FPGA or another programmable logic device, or the like. Further, the program may include program code, and the program code includes a computer operation instruction.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompany drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

A network architecture and a service scenario that are described in the embodiments of this application are intended to describe the technical solutions of the embodiments of this application more clearly, but are not construed as any limitation on the technical solutions provided in the embodiments of this application. A person of ordinary skill in the art may know that as the network architecture evolves and a new service scenario emerges, the technical solutions provided in the embodiments of this application are also applicable to resolving a similar technical problem.

With reference to the specific implementations, a bandwidth control procedure shown in FIG. 2 may be described as follows.

Step 201: Determine an upper bandwidth limit of a network device.

The upper bandwidth limit indicates a maximum data read/write amount of the network device per unit of time.

During implementation, the network device may be a server corresponding to a plurality of clients. Each client may register with the network device, and the registered client may exchange data with the network device. For example, a network device in a data cloud storage system may provide a plurality of data services for each registered client, and the network device may establish a data connection to each client, set a particular upper bandwidth limit for each data connection, and allocate a bandwidth for the client based on the upper bandwidth limit such that the client exchanges data with the device based on the allocated bandwidth. Further, the upper bandwidth limit of the network device may vary in real time, usually depending on a total of data read/write rates of all clients. Therefore, each time before resetting an upper bandwidth limit for the client and allocating a bandwidth to the client, the network device may determine a current upper bandwidth limit of the network device in order to perform setting processing on the upper bandwidth limit of each client based on the current upper bandwidth limit of the network device.

This step may be implemented by the processor 120.

Optionally, a trigger condition for resetting the upper bandwidth limit for the client by the network device may be preset. Further, processing of step 201 may include determining the upper bandwidth limit of the network device at a preset time interval, or determining the upper bandwidth limit of the network device when detecting that the bandwidth of the client changes.

During implementation, it may be set that the network device periodically resets the upper bandwidth limit for each client, and in this case, the network device needs to redetermine the upper bandwidth limit of the network device at the preset time interval. Alternatively, it may be set that the network device resets the upper bandwidth limit for each client when detecting that the bandwidth of the client changes, and in this case, the network device can detect a bandwidth fluctuation of the client in real time. When the bandwidth fluctuation is greater than a particular amplitude, the network device may be triggered to redetermine the upper bandwidth limit of the network device.

Optionally, the network device may determine the upper bandwidth limit of the network device based on a magnetic disk load status of the network device and a throughput rate of the network device.

The magnetic disk load status may be classified into two statuses, full load of a magnetic disk and unsaturated load of the magnetic disk.

During implementation, the network device may obtain the magnetic disk load status of the network device using an operating system tool, and obtain a throughput rate of the network device, that is, a total bandwidth of all the registered clients. Further, if it is detected that the magnetic disk of the network device is at full load, the throughput rate of the network device may be set to the upper bandwidth limit of the network device. If the magnetic disk of the network device is at unsaturated load, an estimated upper bandwidth limit of the network device that is preset by a user needs to be obtained, a larger value of the throughput rate and the estimated upper bandwidth limit of the network device may be selected, and the larger value is multiplied by a relaxation factor greater than 1 to obtain the upper bandwidth limit of the network device. For example, if the estimated upper bandwidth limit that is set by the user is 100 megabytes (MB)/second (s), the throughput rate of the network device is 90 MB/s, and the relaxation factor is 1.1, the upper bandwidth limit of the network device may be set to 110 MB/s. If the throughput rate of the network device is 120 MB/s and the relaxation factor is 1.1, the upper bandwidth limit of the network device is 132 MB/s. It may be understood that even if an actual upper bandwidth limit of the network device is greater than the determined upper bandwidth limit, because there is a relaxation factor, if the throughput rate of the network device increases, the actual upper bandwidth limit of the network device can be determined after several rounds of iteration. In addition, the user may set the upper bandwidth limit available for the network device. If the actual upper bandwidth limit of the network device is 150 MB/s, the user may set the upper bandwidth limit of the network device to 120 MB/s. In this case, a bandwidth of 30 MB/s can be reserved for other services.

This step may be implemented by the processor 120.

Step 202: Reset an upper bandwidth limit of each client based on the upper bandwidth limit of the network device and a working status of each of a plurality of clients.

The working status includes an offline state, an on-hook state, and a transmission state. The offline state is a state in which a client has not established a connection to the network device, the on-hook state is a state in which a client has established a connection to the network device and a bandwidth is less than a preset threshold, and the transmission state is a state in which a client has established a connection to the network device and a bandwidth is greater than the preset threshold.

During implementation, after determining the upper bandwidth limit of the network device, the network device may obtain the working status of each of the plurality of registered clients. Further, the working status may be classified into the offline state, the on-hook state, and the transmission state in detail. Then, the network device may allocate the upper bandwidth limit of the network device to each client based on the upper bandwidth limit of the network device determined in step 201 and the working status of each client, that is, reset the upper bandwidth limit of each client. It should be noted that, affected by data read/write rate changes of the plurality of clients, usually the upper bandwidth limit of the network device and the working status of the client change frequently. Therefore, the network device needs to periodically perform the foregoing processing of determining the upper bandwidth limit of the network device and setting the upper bandwidth limit of the client. In this way, the network device can correspondingly adjust the upper bandwidth limit of each client when the working status or the bandwidth value of each client changes.

This step may be implemented by the processor 120.

Optionally, the foregoing processing of resetting the upper bandwidth limit of each client may include obtaining a bandwidth of each of the plurality of clients, determining a level-2 bandwidth allocation value of each client based on the upper bandwidth limit of the network device, the working status of each client, and the bandwidth of each client, and resetting the upper bandwidth limit of each client based on the level-2 bandwidth allocation value of each client.

The level-2 bandwidth allocation value is a bandwidth value that is allocated to the client when bandwidth utilization of the network device is the highest.

During implementation, each time when setting the upper bandwidth limit for the client, the network device may obtain the bandwidth of each of the plurality of registered clients, determine the level-2 bandwidth allocation value of each client based on the upper bandwidth limit of the network device, the working status of each client, and the bandwidth of each client, and reset the upper bandwidth limit of each client based on the level-2 bandwidth allocation value of each client. It should be noted that, during a process of determining the level-2 bandwidth allocation value, if a bandwidth of a client is far less than an upper bandwidth limit that is set by the network device for the client, it indicates that a required bandwidth of the client is far less than the upper bandwidth limit allocated by the network device to the client. In this case, the network device may reduce the upper bandwidth limit of the client, and allocate a reduction value to a client whose upper bandwidth limit cannot satisfy a bandwidth requirement, that is, a client whose bandwidth approximates to an upper bandwidth limit. For ease of understanding, the following uses an example for description. However, the example does not constitute any limitation on the foregoing method embodiment, and a person skilled in the art can derive, based on the foregoing allocation rule, an actually detected client bandwidth, and the like, an appropriate solution for performing reallocation for a plurality of clients. For example, upper bandwidth limits that are set by the network device for a client A and a client B are both 100 MB/s, and a detected bandwidth of the client A is 20 MB/s, and a detected bandwidth of the client B is 100 MB/s. In this case, the upper bandwidth limit of the client A may be reduced to 20 MB/s, and a surplus bandwidth of 80 MB/s is allocated to the client B such that the upper bandwidth limit of the client B is changed to 180 MB/s. In this way, the level-2 bandwidth allocation value of each client may be obtained based on the foregoing allocation rule, and the upper bandwidth limit is reset based on the level-2 bandwidth allocation value such that bandwidth utilization of the network device can be effectively improved. In addition, when the upper bandwidth limit of each client is reset based on the level-2 bandwidth allocation value, an upper bandwidth limit of a client whose level-2 bandwidth allocation value is 0 may be set to a smaller value greater than 0, for example, 1 MB/s. This can effectively avoid a case in which due to an upper bandwidth limit 0, no bandwidth can be allocated to a client that has a bandwidth requirement, and a data service cannot be performed in time. It may be understood that for each client, a bandwidth is seldom equal to an upper bandwidth limit, and therefore a total of upper bandwidth limits of all the registered clients may be greater than the upper bandwidth limit of the network device.

This step may be implemented by the processor 120.

Optionally, the level-2 bandwidth allocation value of each client may be determined based on a shared bandwidth threshold, and correspondingly, part of the foregoing processing may include determining a shared bandwidth threshold based on the upper bandwidth limit of the network device and the working status of each client, for each first-type client whose bandwidth is less than the shared bandwidth threshold, determining a bandwidth of the client as a level-2 bandwidth allocation value of the client, and for each second-type client whose bandwidth is greater than or equal to the shared bandwidth threshold, determining a quotient obtained by dividing a remaining unallocated bandwidth value by a quantity of second-type clients as a level-2 bandwidth allocation value of the client.

The shared bandwidth threshold is a threshold used to determine whether to adjust the upper bandwidth limit, and the remaining unallocated bandwidth value is a difference between the upper bandwidth limit of the network device and a total bandwidth of all first-type clients.

During implementation, when determining the level-2 bandwidth allocation value of the client, the network device may determine the shared bandwidth threshold based on the upper bandwidth limit of the network device and the working status of each client. Further, the network device may determine a quantity of clients that are in an on-hook state and in a transmission state, averagely allocate the upper bandwidth limit of the network device determined in step 201 to the clients that are in an on-hook state and in a transmission state, and use allocated values as upper bandwidth limits of these clients. In this case, a specific value of the shared bandwidth threshold may be determined as a final allocation value. In addition, in view of a bandwidth fluctuation, a value obtained by dividing the allocation result by a preset constant slightly greater than 1 (for example, 1.1 or 1.2, and the constant is usually not greater than 2, but may be another value in some scenarios) may be determined as the shared bandwidth threshold. Then, the network device may compare a real-time bandwidth of each client with the shared bandwidth threshold, set a client whose bandwidth is less than the shared bandwidth threshold as the first-type client, and set a client whose bandwidth is greater than or equal to the shared bandwidth threshold as the second-type client. Subsequently, the network device may determine a level-2 bandwidth allocation value of the first-type client as a bandwidth of the client, and determine the remaining unallocated bandwidth value, that is, determine the difference between the upper bandwidth limit of the network device and the total bandwidth of all the first-type clients. Further, the network device may determine a level-2 bandwidth allocation value of the second-type client as the quotient obtained by dividing the remaining unallocated bandwidth value by the quantity of second-type clients. For example, the upper bandwidth limit of the network device is 400 MB/s, and there are four clients A, B, C, and D. There is one client that is in an on-hook state, a client A with a real-time bandwidth of 20 MB/s, there are two clients that are in a transmission state, a client B and a client C respectively with a real-time bandwidth of 133 MB/s and 128 MB/s, and there is one client that is in an offline state, a client D with a real-time bandwidth of 0. Therefore, the upper bandwidth limit of the network device may be averagely allocated to the three clients, the clients A, B, and C that are in an on-hook state or in a transmission state, and use allocated values as the bandwidths available for these clients. 133 MB/s may be obtained by each client, and 133 MB/s is divided by a preset constant 1.1 to obtain the remaining unallocated bandwidth value of 121 MB/s. In this case, the clients A and D are first-type clients, a level-2 bandwidth allocation value of the client A is 20 MB/s, and a level-2 bandwidth allocation value of the client D is 0, the clients B and C are second-type clients, and level-2 bandwidth allocation values of the clients B and C are both 190 MB/s.

It should be noted that, after the level-2 bandwidth allocation value of each client is determined, the level-2 bandwidth allocation value may be adjusted based on the bandwidth of each client. Further, if there is a client whose bandwidth is far less than a level-2 bandwidth allocation value and there is a client whose bandwidth approximates to or is equal to its own level-2 bandwidth allocation value, the level-2 bandwidth allocation value of the former client may be adjusted to the bandwidth of the later client in order to save a large bandwidth allocation value. In addition, the network device may averagely allocate the saved bandwidth allocation value to a client whose required bandwidth may be greater than a bandwidth allocation value. To be specific, the network device may allocate the saved bandwidth allocation value to a client meeting conditions that its level-2 bandwidth allocation value is greater than the shared bandwidth threshold, and a difference between the bandwidth and the level-2 bandwidth allocation value of the client is less than the preset threshold. For example, based on the foregoing example, the level-2 bandwidth allocation value of the client A is 20 MB/s, the level-2 bandwidth allocation values of the clients B and C are both 190 MB/s, and the level-2 bandwidth allocation value of the client D is 0. Then, it is detected that a bandwidth of the client B is 150 MB/s and a bandwidth of the client C is 190 MB/s. In this case, the level-2 bandwidth allocation value of the client B may be adjusted to 150 MB/s, and a saved 40 MB/s may be allocated to the client C, therefore, the level-2 bandwidth allocation value of the client C is adjusted to 230 MB/s. It should be noted that, if a bandwidth of a client is far less than a level-2 bandwidth allocation value, it indicates that the bandwidth allocation value that is set by the network device for the client is in surplus. If a bandwidth of a client approximates to or is equal to a level-2 bandwidth allocation value, it is quite possible that a required bandwidth exceeds the level-2 bandwidth allocation value because the bandwidth of the client is a fluctuation value, and in this case, the bandwidth allocation value that is set by the network device for the client may be insufficient. It may be understood that level-2 bandwidth allocation values are determined and adjusted only when registered clients include both of a client with a surplus bandwidth allocation value and a client with an insufficient bandwidth allocation value.

This step may be implemented by the processor 120.

Optionally, the upper bandwidth limit of the client may be set based on the level-2 bandwidth allocation value with reference to another bandwidth allocation manner, and corresponding processing may include determining an entirely fair bandwidth allocation value of each client, determining a level-1 bandwidth allocation value of each client based on the upper bandwidth limit of the network device and the working status of each client, and resetting the upper bandwidth limit of each client based on the entirely fair bandwidth allocation value, the level-1 bandwidth allocation value, and the level-2 bandwidth allocation value that are of each client.

The entirely fair bandwidth allocation value is a bandwidth value that is allocated to each client when the upper bandwidth limit of the network device is averagely allocated to all the clients, and the level-1 bandwidth allocation value is a bandwidth value that is allocated to each client when the upper bandwidth limit of the network device is averagely allocated to all clients that are in an on-hook state and in a transmission state.

During implementation, the network device may obtain a total quantity of all the registered clients, and divide the upper bandwidth limit of the network device by the total quantity of all the registered clients to obtain the entirely fair bandwidth allocation value of each client. In addition, the network device may determine a total quantity of clients that are in an on-hook state and in a transmission state based on the working status of each client, and divide the upper bandwidth limit of the network device by the total quantity of clients that are in an on-hook state and in a transmission state to obtain the level-1 bandwidth allocation value of each client. Further, the network device may reset the upper bandwidth limit of each client based on the entirely fair bandwidth allocation value, the level-1 bandwidth allocation value, and the level-2 bandwidth allocation value that are of each client. Further, a largest value among the three allocation values may be selected as the upper bandwidth limit of each client. For example, based on the four clients the clients A, B, C, and D, it is learnt that the level-2 bandwidth allocation values of the four clients are 20 MB/s, 230 MB/s, 150 MB/s, and 0, respectively, the upper bandwidth limit of the network device is 400 MB/s, entirely fair bandwidth allocation values of the four clients are all 100 MB/s, and level-1 bandwidth allocation values of the three clients A, B, and C, are all 133 MB/s, and a level-1 bandwidth allocation value of the client D is 0. In this case, for each client, a largest value among the three allocation values is selected as the upper bandwidth limit, and therefore upper bandwidth limits of the four clients A, B, C, and D, are 133 MB/s, 230 MB/s, 150 MB/s, 100 MB/s, respectively. It may be understood that determining the largest value among the entirely fair bandwidth allocation value, the level-1 bandwidth allocation value, and the level-2 bandwidth allocation value as the upper bandwidth limit of each client is merely one feasible processing manner, and the upper bandwidth limit of each client may be determined in another processing manner, for example, an average of the three allocation values or a value obtained by adding the three allocation values according to a particular weight is determined as the upper bandwidth limit of each client. Other processing processes are not detailed in this embodiment.

This step may be implemented by the processor 120.

Optionally, when the upper bandwidth limit of each client is set, a weight of each client may be considered. Correspondingly, processing of step 202 may include obtaining a preset client weight of each client, and resetting the upper bandwidth limit of each client based on the upper bandwidth limit of the network device, the working status of each client, and the preset client weight of each client.

The preset client weight is a value used to indicate a bandwidth allocation proportion of each client.

During implementation, a skilled person on the network device side may preset, for all the registered clients, weights (that is, the preset client weights) used to allocate bandwidths, and then store identification information and the corresponding preset client weights of the clients. Further, the client weights may be allocated and set based on importance of all the clients. For example, the clients may be divided into five classes in ascending order of importance a common client, a silver client, a gold client, a diamond client, and an honor client. Correspondingly, preset client weights corresponding to the clients of different levels are 1, 2, 3, 4, and 5, respectively. Therefore, a value relationship between the weights may indicate a relationship between bandwidth values that can be allocated to the clients of the different levels. For example, based on a relationship between weights, it may be considered that one silver client is equivalent to two common clients, and to be specific, a bandwidth that can be allocated to one silver client is twice as much as that for one common client, one gold client is equivalent to three common clients, and to be specific, a bandwidth that can be allocated to one gold client is three times as much as that for one common client, one diamond client is equivalent to four common clients, and to be specific, a bandwidth that can be allocated to one diamond client is four times as much as that for one common client. When resetting the upper bandwidth limit of each client, the network device may first obtain the prestored preset client weight of each client, and then reset the upper bandwidth limit of each client based on the upper bandwidth limit of the network device, the working status of each client, and the preset client weight of each client. Further, a client whose preset client weight 1 may be used as a basic client, and all the clients during the foregoing processing process can be considered as a set of basic clients. If a preset client weight of a client is N, a bandwidth allocation value of the client may be a total of bandwidth allocation values of N basic clients. In this case, the bandwidth allocation value may include an entirely fair bandwidth allocation value, a level-1 bandwidth allocation value, and a level-2 bandwidth allocation value. For example, a total bandwidth of the network device is 400 MB/s, there are four clients A, B, C, and D, the client A is in an on-hook state, the client B and the client C are in a transmission state, and the client D is in an offline state, bandwidths of the four clients A, B, C, and D, are 20 MB/s, 200 MB/s, 100 MB/s, and 0, respectively, and a weight of the client B is 2, and weights of the clients A, C, and D are all 1. In this case, the client B is equivalent to two basic clients, each of the clients A, C, and D each is equivalent to one basic client, and it may be considered that there are five basic clients in total. If the total bandwidth of the network device is averagely allocated to each basic client, an entirely fair bandwidth allocation value of each basic client is 80 MB/s. However, in consideration of a working status, four basic clients are in an on-hook state or in a transmission state, and therefore a level-1 bandwidth allocation value is 100 MB/s. Based on a manner of calculating a level-2 bandwidth allocation value, a shared bandwidth threshold is 100 MB/s, for the client A whose bandwidth is less than the shared bandwidth threshold, a level-2 bandwidth allocation value of the client A may be determined as the bandwidth of the client A, that is, 20 MB/s, and a surplus upper bandwidth limit of 80 MB/s may be allocated to the clients B and C (that is, three basic clients). In consideration of weights of the clients B and C, the client B is equivalent to two basic clients, and the client C is equivalent to one basic client, therefore, a level-2 bandwidth allocation value of the client B is 253 MB/s, and a level-2 bandwidth allocation value of the client C is 127 MB/s. Then, the largest value among the entirely fair bandwidth allocation value, the level-1 bandwidth allocation value, and the level-2 bandwidth allocation value that are of each client may be set as the upper bandwidth limit of the client. It may be understood that the network device may further set different priorities for the clients. When both a client of a higher priority and a client of a lower priority have a bandwidth requirement, the network device satisfies the bandwidth requirement of the client of a higher priority.

This step may be implemented by the processor 120 and the memory 130.

Optionally, when the upper bandwidth limit of each client is being reset, a preset value range of the upper bandwidth limit of each client may be considered. Correspondingly, processing of step 202 may include obtaining a preset value range of the upper bandwidth limit of each client, and resetting the upper bandwidth limit of each client based on the upper bandwidth limit of the network device, the working status of each client, and the preset value range of the upper bandwidth limit of each client.

The preset client weight is a value used to indicate a bandwidth allocation proportion of each client.

During implementation, a skilled person on the network device side may preset value ranges of upper bandwidth limits for some registered clients, and then store identification information and the corresponding preset value ranges of the clients. When setting the upper bandwidth limit of each client, the network device may first obtain the prestored preset value range of the upper bandwidth limit of each client, and then reset the upper bandwidth limit of each client based on the upper bandwidth limit of the network device, the working status of each client, and the preset value range of the upper bandwidth limit of each client. Further, when the upper bandwidth limit of the client is being set, the upper bandwidth limit of each client should be within the preset value range of the upper bandwidth limit of the client. For example, if a preset value range of an upper bandwidth limit of a client A is 50 MB/s to 100 MB/s, an upper bandwidth limit that is allocated by the network device to the client A at any moment should be within 50 MB/s to 100 MB/s. In addition, when a level-2 bandwidth allocation value is being determined, it is required to ensure that a level-2 bandwidth allocation value of each client is within a preset value range. For example, a total bandwidth of the network device is 400 MB/s, there are four clients A, B, C, and D, the client A is in an on-hook state, the client B and the client C are in a transmission state, and the client D is in an offline state, bandwidths of the four clients A, B, C, and D, are 20 MB/s, 133 MB/s, 128 MB/s, and 0, respectively, and a preset value range of an upper bandwidth limit of the client A is 50 MB/s to 100 MB/s, a preset value range of an upper bandwidth limit of the client B is 100 MB/s to 150 MB/s, and the bandwidth 20 MB/s of the client A is less than a minimum value 50 MB/s in the preset value range of the upper bandwidth limit of the client A. In this case, an obtained level-2 bandwidth allocation value of the client A is 50 MB/s. After the upper bandwidth limit 50 MB/s is reserved for the client A, a surplus bandwidth 83 MB/s of the client A is averagely allocated to the clients B and C, and therefore both the bandwidth limits of the clients B and C are 175 MB/s. 175 MB/s is greater than a maximum value of the preset value range of the upper bandwidth limit of the client B, and therefore a level-2 bandwidth allocation value of the client B should be set to 150 MB/s. In this way, a surplus bandwidth 50 MB/s may be allocated to the client C, and therefore a level-2 bandwidth allocation value is 200 MB/s and a level-2 bandwidth allocation value of the client D is 0. If a largest value among an entirely fair bandwidth allocation value, a level-1 bandwidth allocation value, and a level-2 bandwidth allocation value needs to be selected as an upper bandwidth limit, it may be obtained that upper bandwidth limits of the four clients are 100 MB/s, 150 MB/s, 200 MB/s, and 100 MB/s, respectively.

This step may be implemented by the processor 120 and the memory 130.

Step 203: Reallocate a bandwidth of the network device to each client based on the upper bandwidth limit of each client.

During implementation, after setting the upper bandwidth limit for each client, the network device may allocate a bandwidth to each client based on the upper bandwidth limit in order to ensure that the bandwidth allocated to each client is not greater than the upper bandwidth limit corresponding to the client. Further, for each registered client, the network device may create a bandwidth limiter specially configured to control an upper bandwidth limit of the client. The bandwidth limiter may be a process or a thread. After the upper bandwidth limit of each client is determined, the bandwidth of each client may be limited using the bandwidth limiter corresponding to each client such that a bandwidth that can be used by the client does not exceed a corresponding upper bandwidth limit. It should be noted that in a feasible case, a client may function as the network device. To be specific, the client provides a service for a plurality of lower-level clients, where the lower-level clients have registered with the client, and further, the client may reset an upper bandwidth limit of each lower-level client based on an upper bandwidth limit that is set by the network device for the client and a working status of each of the plurality of lower-level clients, and allocate a bandwidth to each lower-level client.

This step may be implemented by the processor 120.

Optionally, if the client has a plurality of services to be transmitted, the client may determine an upper bandwidth limit of each service based on a service type of each service, and corresponding processing may include, for a client in a transmission state, obtaining service types of a plurality of services that are being transmitted by the client, determining, based on a prestored correspondence between a service type and a service weight, a service weight corresponding to a service type of each service of the client, and determining the upper bandwidth limit of each service of the client based on the upper bandwidth limit of the client and the service weight corresponding to the service type of each service of the client.

The service weight is a value used to indicate importance of each service type.

During implementation, a skilled person on the network device side may preset, based importance of service types of all services that are supported by the network device, corresponding service weights for the service types. That is, a more important service corresponds to a larger service weight. For example, a weight of a data query service is 1, a weight of a data import service is 2, and a weight of a data downloading service is 3. Then, a correspondence between a service type and a service weight is stored. In this way, when a client in various transmission states transmits a plurality of services, the network device may obtain service types of the plurality of services, determine, based on the prestored correspondence between a service type and a service weight, a service weight corresponding to a service type of each service of the client, and determine an upper bandwidth limit of each service of the client based on an upper bandwidth limit of the client and the service weight corresponding to the service type of each service of the client. For example, an upper bandwidth limit of the client is 150 MB/s, the client is transmitting three services a, b, and c, and corresponding service weights are 1, 2, and 3, respectively. In this case, it may be determined that an upper bandwidth limit of the service a is 25 MB/s, an upper bandwidth limit of the service b is 50 MB/s, and an upper bandwidth limit of the service c is 75 MB/s. It may be understood that the network device may further set different priorities for service types. When a service of a higher priority and a service of a lower priority exist at the same time, the network device may process the service of a higher priority.

This step may be implemented by the processor 120 and the memory 130.

Figure 3:
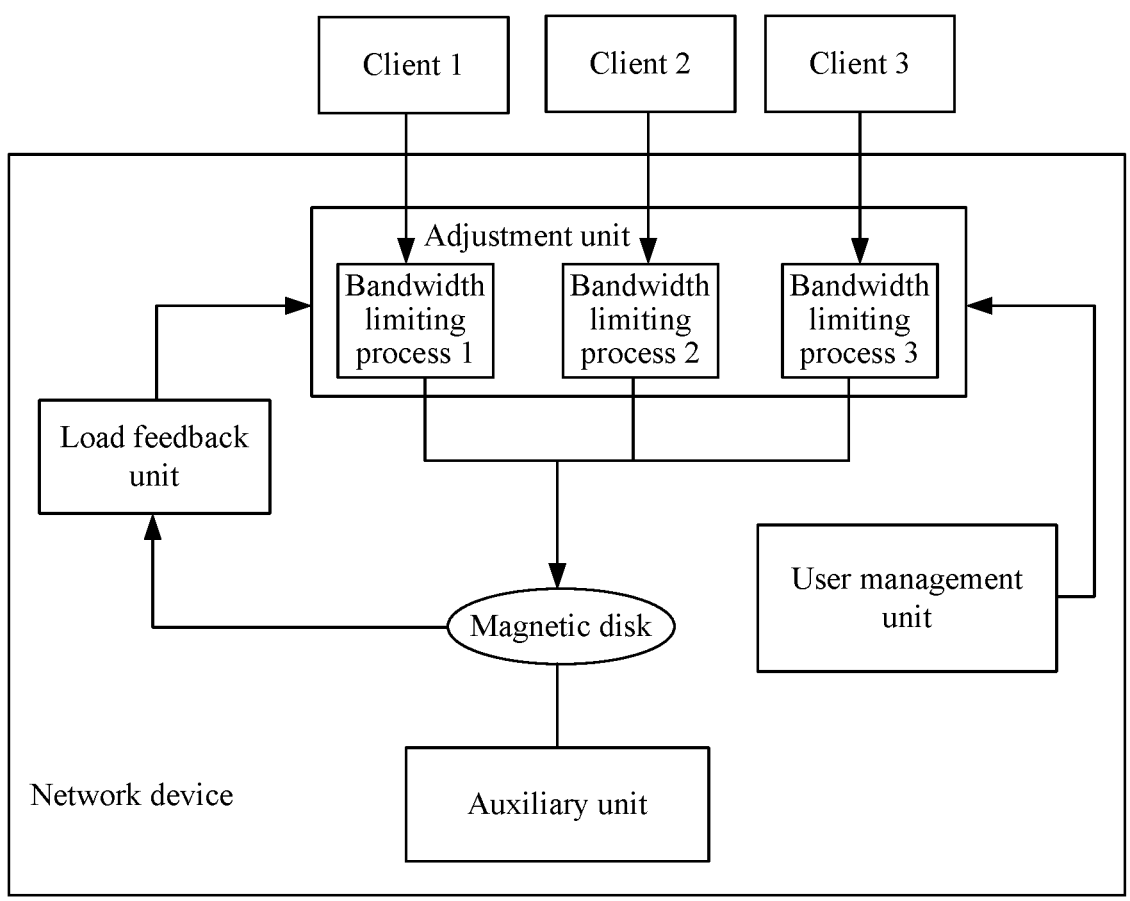
FIG. 3 is a framework diagram of a bandwidth control principle according to an embodiment of this application.

FIG. 3 is a framework diagram of a principle of the solution. All of a user management unit, an adjustment unit, and a load feedback unit may be independent processes or containers in a network device, and are controlled by a processor to implement corresponding functions. The units may exchange information with each other. Certainly, these processes or containers may alternatively be distributed on different virtual machines. The user management unit may be configured to record user-related information such as a client weight and a client priority. The adjustment unit includes a plurality of bandwidth limiting processes, where each bandwidth limiting process may be used to limit a bandwidth of each client based on an upper bandwidth limit of each client. The load feedback unit may be configured to detect an upper bandwidth limit of the network device. An auxiliary unit may be configured to estimate a magnetic disk load status, record a correspondence between a directory and a magnetic disk, and collect statistics on a bandwidth of the network device. The magnetic disk is an entity component of the network device. The client is a terminal device independent of the network device and has established a data connection to the network device, and may exchange data with the network device. For example, the client initiates a data read/write request to the network device and establishes a data connection to the network device. The adjustment unit may obtain the client information such as the client weight and the client priority from the user management unit, and create/initiate the bandwidth limiting process corresponding to the client, to limit the bandwidth of the client. When the network device resets the upper bandwidth limit for each client, the load feedback unit may detect a magnetic disk of the network device, determine a latest upper bandwidth limit of the network device, and provide the upper bandwidth limit for the adjustment unit. Then, the adjustment unit may determine the upper bandwidth limit of each client based on the upper bandwidth limit of the network device, the client information, and a working status of the client, and perform bandwidth control on the client using the bandwidth limiting process and based on the upper bandwidth limit of each client.

Certainly, in an implementation, the architecture shown in FIG. 3 may be applied to a cloud scenario. For example, the architecture is a network traffic control platform, and a user management unit, an adjustment unit, and a load feedback unit of the platform may be processes or threads. These processes or threads may be distributed on different physical nodes or virtual nodes, and the virtual node may be a virtual machine or a container. The network device may be a unified traffic management device on the network traffic control platform. The traffic management device includes at least the adjustment unit configured to set and adjust an upper bandwidth limit of a client that exchanges data with the network traffic control platform. The user management unit may be deployed in an independent user information management device on the network traffic control platform, and when processing described in the foregoing embodiment is performed, the user information management device may provide, using the user management unit, user information stored in the user management unit for the adjustment unit in the traffic management device. Likewise, the load feedback unit may be deployed in an independent load monitoring device on the network traffic control platform, and the load monitoring device may collect, in real time using the load feedback unit, statistics on a total upper bandwidth limit that can be provided by the network traffic control platform in order to provide the total upper bandwidth limit for the traffic management device for bandwidth control processing.

In this embodiment of the present disclosure, when providing a service for the registered clients, the network device may determine the upper bandwidth limit of the network device, reset the upper bandwidth limit of each client based on the working status of each client and the upper bandwidth limit of the network device, and allocate the bandwidth to each client based on the upper bandwidth limit of each client. In this way, if the working status of the client changes, the network device can correspondingly adjust the upper bandwidth limit of each client in a relatively timely manner, and reallocate the bandwidth to each client based on the upper bandwidth limit of each client. Therefore, bandwidth allocation flexibility can be improved.

Figure 4:
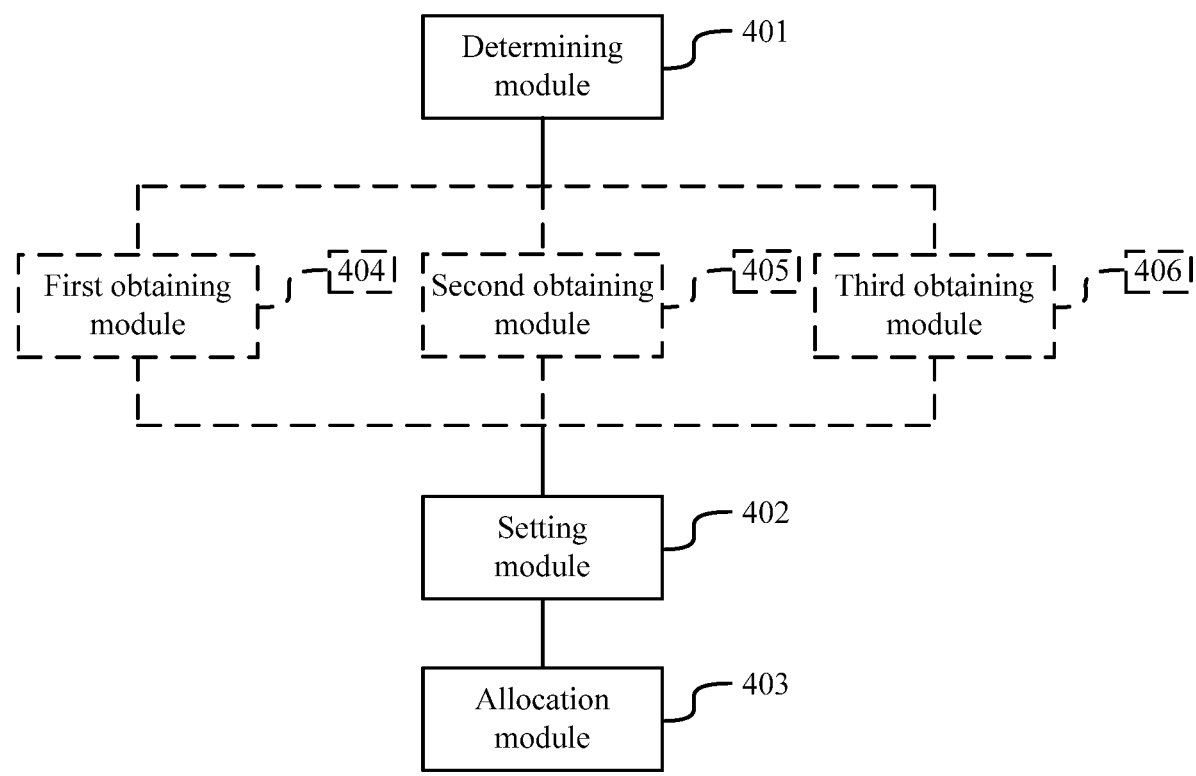
FIG. 4 is a structural block diagram of a bandwidth control apparatus according to an embodiment of this application.

FIG. 4 is a block diagram of a bandwidth control apparatus according to an embodiment of the present disclosure. The apparatus may be implemented as a part or all of the apparatus using software, hardware, or a combination thereof. The bandwidth control apparatus provided in this embodiment of the present disclosure may implement the procedure shown in FIG. 2 in the embodiments of the present disclosure. The apparatus includes a determining module 401, a setting module 402, an allocation module 403, a first obtaining module 404, a second obtaining module 405, and a third obtaining module 406, where the determining module 401 is configured to determine an upper bandwidth limit of a network device, where the upper bandwidth limit indicates a maximum data read/write amount of the network device per unit of time, the network device is configured to provide a service for a plurality of clients, and the plurality of clients have registered with the network device, the setting module 402 is configured to reset an upper bandwidth limit of each client based on the upper bandwidth limit of the network device and a working status of each of the plurality of clients, where the working status includes an offline state, an on-hook state, and a transmission state, the offline state is a state in which a client has not established a connection to the network device, the on-hook state is a state in which a client has established a connection to the network device and a bandwidth is less than a preset threshold, and the transmission state is a state in which a client has established a connection to the network device and a bandwidth is greater than the preset threshold, and the allocation module 403 is configured to reallocate a bandwidth of the network device to each client based on the upper bandwidth limit of each client.

Optionally, the setting module 402 is further configured to obtain a bandwidth of each of the plurality of clients, determine a level-2 bandwidth allocation value of each client based on the upper bandwidth limit of the network device, the working status of each client, and the bandwidth of each client, where the level-2 bandwidth allocation value is a bandwidth value that is allocated to the client when bandwidth utilization of the network device is the highest, and reset the upper bandwidth limit of each client based on the level-2 bandwidth allocation value of each client.

Optionally, the setting module 402 is further configured to determine a shared bandwidth threshold based on the upper bandwidth limit of the network device and the working status of each client, where the shared bandwidth threshold is a threshold used to determine whether to adjust the upper bandwidth limit, for each first-type client whose bandwidth is less than the shared bandwidth threshold, determine a bandwidth of the client as a level-2 bandwidth allocation value of the client, and for each second-type client whose bandwidth is greater than or equal to the shared bandwidth threshold, determine a quotient obtained by dividing a remaining unallocated bandwidth value by a quantity of second-type clients as a level-2 bandwidth allocation value of the client, where the remaining unallocated bandwidth value is a difference between the upper bandwidth limit of the network device and a total bandwidth of all first-type clients.

Optionally, the determining module 401 is further configured to determine an entirely fair bandwidth allocation value of each client, where the entirely fair bandwidth allocation value is a bandwidth value that is allocated to each client when the upper bandwidth limit of the network device is averagely allocated to all the clients, the determining module 401 is further configured to determine a level-1 bandwidth allocation value of each client based on the upper bandwidth limit of the network device and the working status of each client, where the level-1 bandwidth allocation value is a bandwidth value that is allocated to each client when the upper bandwidth limit of the network device is averagely allocated to all clients that are in an on-hook state and in a transmission state, and the setting module 402 is further configured to reset the upper bandwidth limit of each client based on the entirely fair bandwidth allocation value, the level-1 bandwidth allocation value, and the level-2 bandwidth allocation value that are of each client.

Optionally, the determining module 401 is further configured to determine the upper bandwidth limit of the network device based on a magnetic disk load status of the network device and a throughput rate of the network device.

Optionally, the first obtaining module 404 is configured to obtain a preset client weight of each client, where the preset client weight is a value used to indicate a bandwidth allocation proportion of each client, and the setting module 402 is further configured to determine, based on the working status of each client and the preset client weight of each client, a bandwidth allocation share corresponding to each client, and reset the upper bandwidth limit of each client based on the upper bandwidth limit of the network device and the bandwidth allocation share corresponding to each client.

Optionally, the second obtaining module 405 is configured to obtain a preset value range of the upper bandwidth limit of each client, and the setting module 402 is further configured to reset the upper bandwidth limit of each client within the preset value range of the upper bandwidth limit of each client based on the upper bandwidth limit of the network device and the working status of each client.

Optionally, the third obtaining module 406 is configured to, for a client in a transmission state, obtain service types of a plurality of services that are being transmitted by the client, and the determining module 401 is further configured to determine, based on a prestored correspondence between a service type and a service weight, a service weight corresponding to a service type of each service of the client, where the service weight is a value used to indicate importance of each service type, and the determining module 401 is further configured to reset an upper bandwidth limit of each service of the client based on an upper bandwidth limit of the client and the service weight corresponding to the service type of each service of the client.

Figure 2:
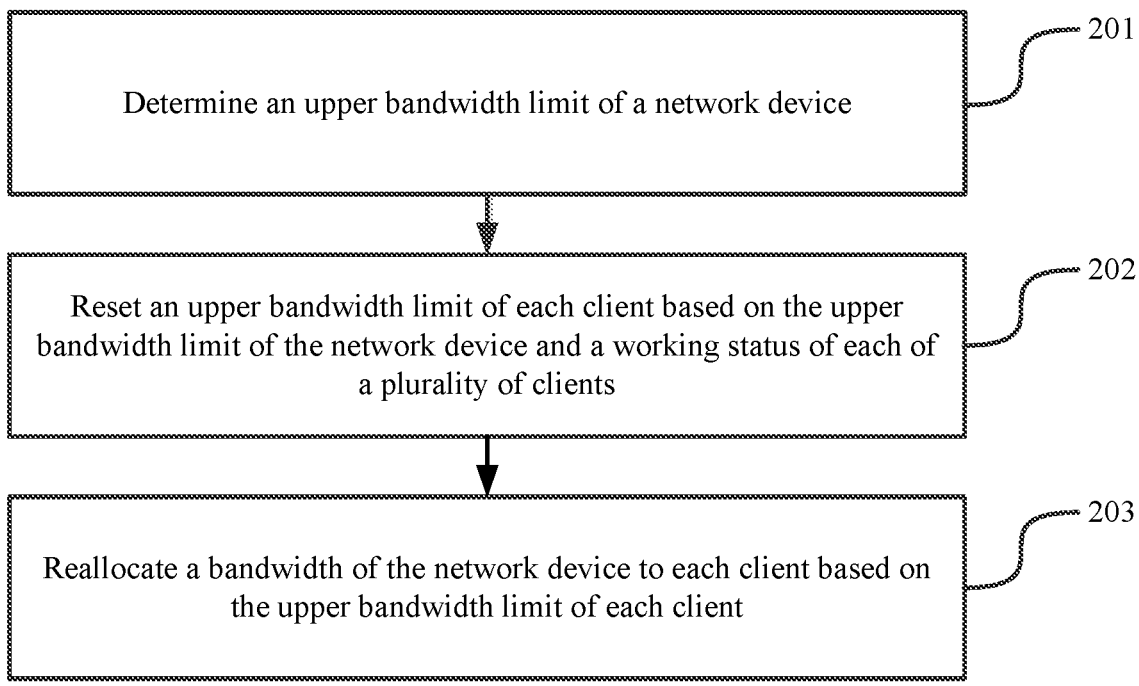
FIG. 2 is a schematic flowchart of a bandwidth control method according to an embodiment of this application.

For related details, refer to the method embodiment shown in FIG. 2.

It should be noted that, the determining module 401, the setting module 402, and the allocation module 403 may be implemented by the processor 120, and the first obtaining module 404, the second obtaining module 405, and the third obtaining module 406 may be implemented by the memory 130 or implemented by the memory 130 and the processor 120.

In this embodiment of the present disclosure, when providing the service for the registered clients, the network device may determine the upper bandwidth limit of the network device, reset the upper bandwidth limit of each client based on the working status of each client and the upper bandwidth limit of the network device, and reallocate the bandwidth to each client based on the upper bandwidth limit of each client. In this way, if the working status of the client changes, the network device can correspondingly adjust the upper bandwidth limit of each client in a relatively timely manner, and allocate the bandwidth to each client based on the upper bandwidth limit of each client. Therefore, bandwidth allocation flexibility can be improved.

It should be noted that when the bandwidth control apparatus provided in the foregoing embodiment controls a bandwidth, the division of the foregoing functional modules is merely used as an example for description. In an embodiment, the foregoing functions can be allocated to different functional modules for implementation depending on a requirement, that is, an internal structure of the apparatus is divided into different functional modules to implement all or some of the foregoing functions. In addition, the bandwidth control apparatus provided in the foregoing embodiment is based on a same concept as the embodiment of the bandwidth control method. For a specific implementation process thereof, refer to the method embodiment. Details are not described herein again.

In the foregoing embodiments, all or some of the functions may be implemented using software, hardware, or any combination thereof. When being implemented using software, all or some of the functions may be implemented in a form of a computer program product. The computer program product includes one or more computer instructions. When the computer program instructions are loaded and executed on the network device, all or some of the procedures or functions described in the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by the network device, or a data storage device, such as a server or a data center, integrating one or more usable media. The usable medium may be a magnetic medium (for example, a FLOPPY DISK, a hard disk, or a magnetic tape), an optical medium (for example, a digital video disc (DVD)), or a semiconductor medium (for example, a solid-state disk).

The foregoing descriptions are merely feasible embodiments of this application, but are not intended to limit this application. Any modification, equivalent replacement, or improvement made without departing from the spirit and principle of this application should fall within the protection scope of this application.

What is claimed is:

1. A bandwidth control method, comprising:
    obtaining a first upper bandwidth limit of a network device, wherein the first upper bandwidth limit indicates a maximum data read/write amount of the network device per unit of time, and wherein the network device provides a service for a plurality of clients that have registered with the network device;
    resetting a second upper bandwidth limit of each of the plurality of clients based on the first upper bandwidth limit and a working status of each of the plurality of clients, wherein the working status comprises an offline state, an on-hook state, and a transmission state, wherein a client of the plurality of clients has not established a connection to the network device in the offline state, wherein a client of the plurality of clients has established the connection to the network device and a bandwidth is less than a preset threshold bandwidth in the on-hook state, and wherein a client of the plurality of clients has established the connection to the network device and the bandwidth is greater than the preset threshold bandwidth in the transmission state, wherein resetting the second upper bandwidth limit comprises:
        detecting a second bandwidth of each of the plurality of clients;
        obtaining, a level-2 bandwidth allocation value of each of the plurality of clients based on the first upper bandwidth limit, the working status, and the second bandwidth, wherein each of the plurality of clients comprises the level-2 bandwidth allocation value when bandwidth utilization of the network device is at a highest level, wherein the level-2 bandwidth allocation value is set to the second bandwidth when the second bandwidth is less than the second upper bandwidth limit of the client, and wherein the level-2 bandwidth allocation value is increased when the second bandwidth approximates the second upper bandwidth limit; and
        resetting the second upper bandwidth limit based on the level-2 bandwidth allocation value; and
    reallocating a first bandwidth to each of the plurality of clients based on the second upper bandwidth limit.

2. The bandwidth control method of claim 1, wherein obtaining the level-2 bandwidth allocation value comprises:
    obtaining a shared bandwidth threshold based on the first upper bandwidth limit and the working status, wherein the shared bandwidth threshold is used to determine whether to adjust the second upper bandwidth limit;
    setting a third bandwidth of each of first-type clients as the level-2 bandwidth allocation value of each of the first-type clients, wherein the third bandwidth is less than the shared bandwidth threshold;
    obtaining a quotient by dividing a remaining unallocated bandwidth value by a quantity of second-type clients; and
    setting the quotient as the level-2 bandwidth allocation value of each of the second-type clients, wherein a fourth bandwidth of each of the second-type clients is greater than or equal to the shared bandwidth threshold, and wherein the remaining unallocated bandwidth value is a difference between the first upper bandwidth limit and a total bandwidth of all the first-type clients.

3. The bandwidth control method of claim 1, further comprising:
    obtaining an entirely fair bandwidth allocation value of each of the plurality of clients, wherein each of the plurality of clients comprises the entirely fair bandwidth allocation value when the first upper bandwidth limit is averagely allocated to all the plurality of clients; and
    obtaining a level-1 bandwidth allocation value of each of the plurality of clients based on the first upper bandwidth limit and the working status, wherein each of the plurality of clients comprises the level-1 bandwidth allocation value when the first upper bandwidth limit is averagely allocated to all of the plurality of clients that are in the on-hook state and the transmission state, and
    wherein resetting the second upper bandwidth limit comprises resetting the second upper bandwidth limit based on the entirely fair bandwidth allocation value, the level-1 bandwidth allocation value, and the level-2 bandwidth allocation value.

4. The bandwidth control method of claim 1, wherein obtaining the first upper bandwidth limit comprises obtaining the first upper bandwidth limit based on a magnetic disk load status of the network device and a throughput rate of the network device.

5. The bandwidth control method of claim 1, further comprising obtaining a preset client weight of each of the plurality of clients, wherein the preset client weight indicates a bandwidth allocation proportion of each of the plurality of clients, and wherein resetting the second upper bandwidth limit comprises:
    obtaining, based on the working status and the preset client weight, a bandwidth allocation share of each of the plurality of clients; and
    resetting the second upper bandwidth limit based on the first upper bandwidth limit and the bandwidth allocation share.

6. The bandwidth control method of claim 1, further comprising obtaining a preset value range of the second upper bandwidth limit, and wherein resetting the second upper bandwidth limit comprises resetting, within the preset value range, the second upper bandwidth limit based on the first upper bandwidth limit and the working status.

7. The bandwidth control method of claim 1, further comprising:
    obtaining, for a second client in the transmission state, service types of a plurality of services that are transmitted by the second client;
    obtaining, based on a prestored correspondence between a service type and a service weight, the service weight corresponding to the service type of each of the services, wherein the service weight is a value indicating importance of the service type; and resetting a third upper bandwidth limit of each of the service based on a fourth upper bandwidth limit of the second client and the service weight.

8. A network device, comprising:
a memory configured to store data and a program; and
a processor coupled to the memory and configured to invoke the program, wherein the program is configured to cause the processor to:
provide a service for a plurality of clients that have registered with the network device;
obtain a first upper bandwidth limit of the network device, wherein the first upper bandwidth limit indicates a maximum data read/write amount of the network device per unit of time;
reset a second upper bandwidth limit of each of the plurality of clients based on the first upper bandwidth limit and a working status of each of the plurality of clients, wherein the working status comprises an offline state, an on-hook state, and a transmission state, wherein a client of the plurality of clients has not established a connection to the network device in the offline state, wherein a client of the plurality of clients has established the connection to the network device and a bandwidth is less than a preset threshold bandwidth in the on-hook state, and wherein a client of the plurality of clients has established the connection to the network device and the bandwidth is greater than the preset threshold bandwidth in the transmission state, wherein resetting the second upper bandwidth limit comprises:
detecting a second bandwidth of each of the plurality of clients;
obtaining a level-2 bandwidth allocation value of each of the plurality of clients based on the first upper bandwidth limit, the working status, and the second bandwidth, wherein each of the plurality of clients comprises the level-2 bandwidth allocation value when bandwidth utilization of the network device is at a highest level, wherein the level-2 bandwidth allocation value is set to the second bandwidth when the second bandwidth is less than the second upper bandwidth limit of the client, and wherein the level-2 bandwidth allocation value is increased when the second bandwidth approximates the second upper bandwidth limit; and
resetting the second upper bandwidth limit based on the level-2 bandwidth allocation value; and
reallocate a first bandwidth to each of the plurality of clients based on the second upper bandwidth limit.

9. The network device of claim 8, wherein the program further causes the processor to:
obtain a shared bandwidth threshold based on the first upper bandwidth limit and the working status, wherein the shared bandwidth threshold is used to determine whether to adjust the second upper bandwidth limit;
set a third bandwidth of each of first-type clients as the level-2 bandwidth allocation value of each of the first-type clients, wherein the third bandwidth is less than the shared bandwidth threshold;
obtain a quotient by dividing a remaining unallocated bandwidth value by a quantity of second-type clients; and
set the quotient as the level-2 bandwidth allocation value of each of the second-type clients, wherein a fourth bandwidth of each of the second-type clients is greater than or equal to the shared bandwidth threshold, and wherein the remaining unallocated bandwidth value is a difference between the first upper bandwidth limit and a total bandwidth of all the first-type clients.

10. The network device of claim 8, wherein the program further causes the processor to:
obtain an entirely fair bandwidth allocation value of each of the plurality of clients, wherein each of the plurality of clients comprises the entirely fair bandwidth allocation value when the first upper bandwidth limit is averagely allocated to all of the plurality of clients;
obtain a level-1 bandwidth allocation value of each of the plurality of clients based on the first upper bandwidth limit and the working status, wherein each of the plurality of clients comprises the level-1 bandwidth allocation value when the first upper bandwidth limit is averagely allocated to all of the plurality of clients that are in the on-hook state and the transmission state; and
reset the second upper bandwidth limit based on the entirely fair bandwidth allocation value, the level-1 bandwidth allocation value, and the level-2 bandwidth allocation value.

11. The network device of claim 8, wherein the program further causes the processor to obtain the first upper bandwidth limit based on a magnetic disk load status of the network device and a throughput rate of the network device.

12. The network device of claim 8, wherein the program further causes the processor to:
obtain a preset client weight of each of the plurality of clients stored in the memory, wherein the preset client weight indicates a bandwidth allocation proportion of each of the plurality of clients;
obtain, based on the working status and the preset client weight, a bandwidth allocation share of each of the plurality of clients; and
reset the second upper bandwidth limit based on the first upper bandwidth limit and the bandwidth allocation share.

13. The network device of claim 8, wherein the program further causes the processor to:
obtain a preset value range, stored in the memory, of the second upper bandwidth limit; and
reset, within the preset value range, the second upper bandwidth limit based on the first upper bandwidth limit and the working status.

14. The network device of claim 8, wherein the program further causes the processor to:
obtain, for a second client in the transmission state, service types of a plurality of services that are being transmitted by the second client;
obtain, based on a prestored correspondence between a service type and a service weight, the service weight corresponding to the service type of each of the services, wherein the service weight is a value indicating importance of the service type; and
reset a third upper bandwidth limit of each of the services based on a fourth upper bandwidth limit of the second client and the service weight.

15. A computer program product comprising computer-executable instructions for storage on a non-transitory computer-readable medium that, when executed by a processor of an apparatus, cause the apparatus to:
obtain a first upper bandwidth limit of a network device, wherein the first upper bandwidth limit indicates a maximum data read/write amount of the network device per unit of time, and wherein the network device provides a service for a plurality of clients that have registered with the network device;

reset a second upper bandwidth limit of each of the plurality of clients based on the first upper bandwidth limit and a working status of each of the plurality of clients, wherein the working status comprises an offline state, an on-hook state, and a transmission state, wherein a client of the plurality of clients has not established a connection to the network device in the offline state, wherein a client of the plurality of clients has established the connection to the network device and a bandwidth is less than a preset threshold bandwidth in the on-hook state, and wherein a client of the plurality of clients has established the connection to the network device and the bandwidth is greater than the preset threshold bandwidth in the transmission state, wherein resetting the second upper bandwidth limit comprises:

detecting a second bandwidth of each of the plurality of clients;

obtaining a level-2 bandwidth allocation value of each of the plurality of clients based on the first upper bandwidth limit, the working status, and the second bandwidth, wherein each of the plurality of clients comprises the level-2 bandwidth allocation value when bandwidth utilization of the network device is at a highest level, wherein the level-2 bandwidth allocation value is set to the second bandwidth when the second bandwidth is less than the second upper bandwidth limit of the client, and wherein the level-2 bandwidth allocation value is increased when the second bandwidth approximates the second upper bandwidth limit; and resetting the second upper bandwidth limit based on the level-2 bandwidth allocation value; and reallocate a first bandwidth to each of the plurality of clients based on the second upper bandwidth limit.

16. The computer program product of claim 15, wherein the instructions further cause the apparatus to:

obtain a shared bandwidth threshold based on the first upper bandwidth limit and the working status, wherein the shared bandwidth threshold is used to determine whether to adjust the second upper bandwidth limit;

set a third bandwidth of each of first-type clients as the level-2 bandwidth allocation value of each of the first-type clients, wherein the bandwidth is less than the shared bandwidth threshold; and set a quotient obtained by dividing a remaining unallocated bandwidth value by a quantity of second-type clients as the level-2 bandwidth allocation value of each of the second-type clients, wherein a fourth bandwidth of each of the second-type clients is greater than or equal to the shared bandwidth threshold, and wherein the remaining unallocated bandwidth value is a difference between the first upper bandwidth limit and a total bandwidth of all the first-type clients.

17. The computer program product of claim 15, wherein the instructions further cause the apparatus to:

obtain an entirely fair bandwidth allocation value of each of the plurality of clients, wherein each of the plurality of clients comprises the entirely fair bandwidth allocation value when the first upper bandwidth limit is averagely allocated to all of the plurality of clients;

obtain a level-1 bandwidth allocation value of each of the plurality of clients based on the first upper bandwidth limit and the working status, wherein each of the plurality of clients comprises the level-1 bandwidth allocation value when the first upper bandwidth limit is averagely allocated to all of the plurality of clients that are in the on-hook state and in the transmission state; and reset the second upper bandwidth limit based on the entirely fair bandwidth allocation value, the level-1 bandwidth allocation value, and the level-2 bandwidth allocation value.

\* \* \* \* \*